United States Patent [19]

Cody et al.

[11] Patent Number: 5,130,028
[45] Date of Patent: Jul. 14, 1992

[54] METHOD OF TREATING WASTE WATER FOR ORGANIC CONTAMINANTS WITH WATER DISPERSIBLE ORGANICALLY MODIFIED SMECTITE CLAY COMPOSITIONS

[75] Inventors: Charles A. Cody, Robbinsville; Edward D. Magauran, Mount Holly, both of N.J.

[73] Assignee: Rheox, Inc., Highstown, N.J.

[21] Appl. No.: 583,250

[22] Filed: Sep. 17, 1990

[51] Int. Cl.$^5$ .................................. C02F 1/28
[52] U.S. Cl. ...................... 210/691; 210/714; 210/728; 210/730
[58] Field of Search ............ 210/691, 712, 714, 728, 210/730

[56] References Cited

U.S. PATENT DOCUMENTS

| | | | |
|---|---|---|---|
| 2,015,260 | 9/1935 | Groote | 196/4 |
| 2,367,384 | 1/1945 | Tymstra et al. | 210/1 |
| 3,046,233 | 7/1962 | Levy | 252/193 |
| 3,487,928 | 1/1970 | Canevari | 210/40 |
| 3,723,148 | 3/1973 | Tupper | 134/38 |
| 4,125,476 | 11/1978 | Dean | 252/115 |
| 4,185,970 | 1/1980 | Dean | 55/89 |
| 4,401,574 | 8/1983 | Farrington et al. | 210/908 |
| 4,470,912 | 9/1984 | Beall | 210/691 |
| 4,473,477 | 9/1984 | Beall | 210/691 |
| 4,504,395 | 3/1985 | Harpel et al. | 210/712 |
| 4,517,094 | 5/1985 | Beall | 210/691 |
| 4,549,966 | 10/1985 | Beall | 210/691 |
| 4,564,464 | 1/1986 | Harpel et al. | 210/728 |
| 4,629,572 | 12/1986 | Leitz et al. | 210/714 |
| 4,650,590 | 3/1987 | Beall | 210/691 |
| 4,677,158 | 6/1987 | Tso et al. | 106/287.1 |
| 4,861,491 | 8/1989 | Svensson | 210/691 |
| 5,034,136 | 7/1991 | Cody et al. | 210/691 |

FOREIGN PATENT DOCUMENTS

| | | |
|---|---|---|
| 133071 | 2/1985 | European Pat. Off. |
| 1-239194 | 9/1989 | Japan |
| 1439828 | 6/1976 | United Kingdom |

*Primary Examiner*—Ivars Cintins
*Attorney, Agent, or Firm*—Burns, Doane, Swecker & Mathis

[57] ABSTRACT

A present invention relates to a method of treating waste water for organic contaminants by contacting the waste water with a water dispersible organoclay consisting of the reaction product of at least one ammonium salt and at least one smectite clay, or alternatively, separately with at least one ammonium salt and at least one smectite clay wherein at least one ammonium salt contains at least one hydrophobic group and at least one ammonium salt contains at least one hydrophilic group and wherein said at least one ammonium salt in combination with said at least one smectite clay has a modified methylene blue test value of at least 25 percent sites exchanged.

15 Claims, 1 Drawing Sheet

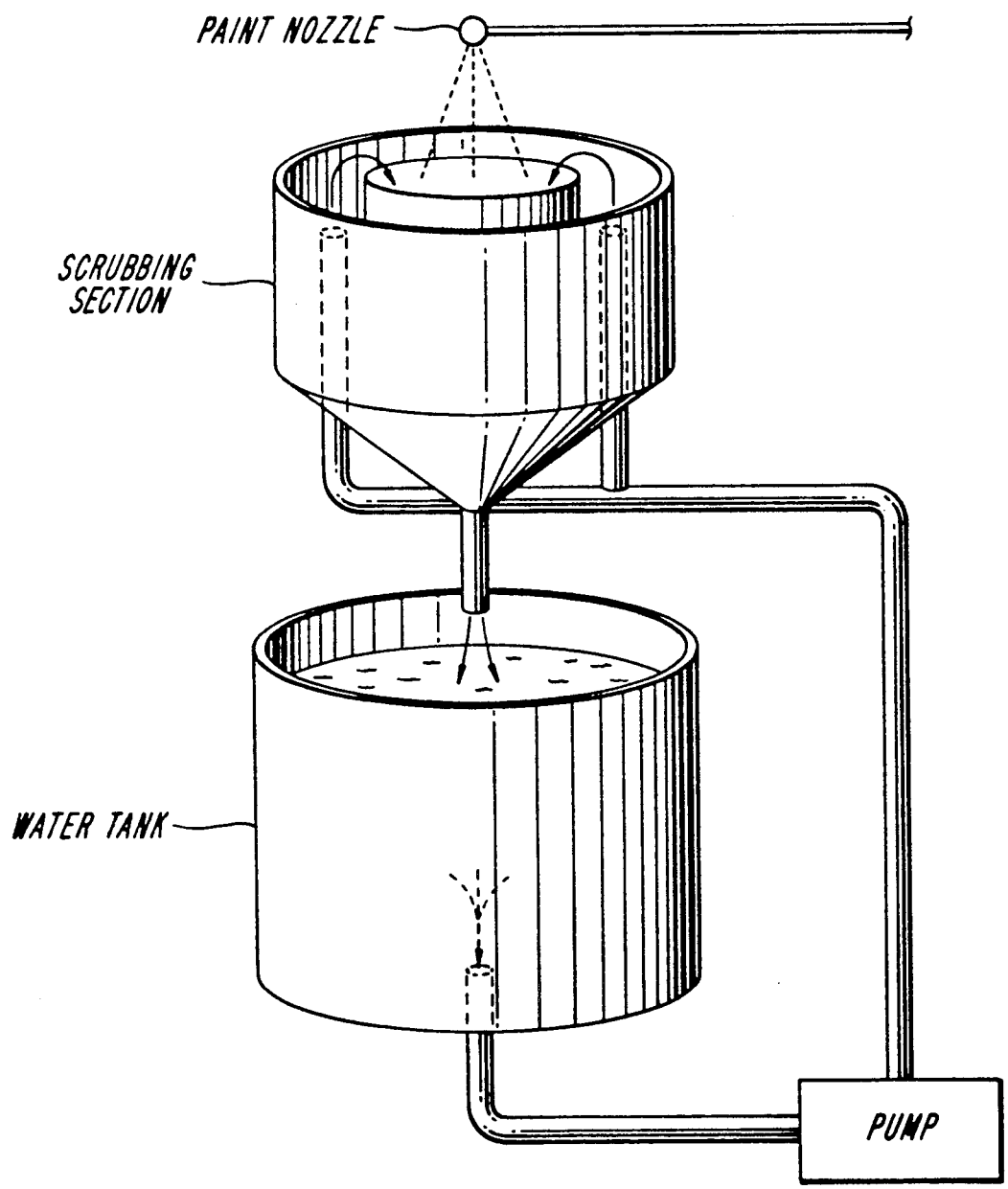

METHOD OF TREATING WASTE WATER FOR ORGANIC CONTAMINANTS WITH WATER DISPERSIBLE ORGANICALLY MODIFIED SMECTITE CLAY COMPOSITIONS

FIELD OF THE INVENTION

The present invention relates to a method of treating waste water comprising contacting the waste water with water dispersible organoclay. This organoclay is a reaction product of at least one ammonium salt and at least one smectite clay, which because of the salt selected exhibits both clay and organoclay properties.

BACKGROUND OF THE INVENTION

In industrial processes, automatic paint spraying techniques are often employed, particularly in the automotive and appliance industries. Automatic paint spraying is generally carried out in spray booths, spray stands or against walls. The paint overspray is removed from the air by washing out with water. When airborne paint particles are captured by a water curtain, the particles, or their components, form a scum on the surface of the water reservoir or sink and accumulate an stick to the bottom of the reservoir. In either case, the paint is difficult to handle because it is tacky and, to the extent that waste can be separated, it contains a large percentage of water. The paint waste adheres to the sump and drain surfaces and must be periodically removed by a method such as shovelling to prevent clogging of the sump and drain surfaces.

U.S. Pat. No. 4,504,395 discloses a composition that is useful for detackifying paint overspray comprising hectorite clay, an antifoaming agent and optionally, an aluminum oxide material and a montmorillonite clay.

U.S. Pat. No. 4,470,912 discloses a method for treating polar or aqueous fluid emulsions of an organic composition comprising contacting the emulsion with an organoclay to adsorb a major portion of the organic composition.

U.S. Pat. No. 4,629,572 discloses detackifying agents for clear oil-based coating compositions composed of (1) a water-dispersible polymeric condensation reaction product of a urea or an amino triazine and an aldehyde and (2) a water-swellable clay.

U.S. Pat. No. 3,723,148 discloses a process for deactivating paint overspray particles using an aqueous alkaline solution which contains a particular organic nitrogen compound. Preferably, the alkaline solution is an aqueous solution of sodium hydroxide and/or sodium silicate, and the organic nitrogen compound is triethanolamine.

U.S. Pat. No. 4,185,970 discloses a composition for trapping and removing paint from a spray booth comprising at least 4% by weight of a water softener, 4% to 25% by weight of a colloid material, 1% to 8% by weight of a surfactant and 5% to 50% by weight of an alkaline material.

U.S. Pat. No. 4,401,574 discloses a method for clarifying paint waste water containing dispersed solids by flocculating the solids with a basic polyaluminum chloride having a defined structural formula. Optionally, a water soluble organic polyelectrolyte is added in conjunction with the polyaluminum compound. Such polyelectrolytes are either homopolymers or copolymers of acrylamide.

U.S. Pat. No. 4,564,464 discloses paint detackifying compositions consisting of hectorite clay, thinning agents such as water soluble aliphatic and/or alicyclic amines, and water conditioning agents such as water soluble polyphosphates.

U.S. Pat. No. 4,861,491 discloses paint detackification compositions utilizing organoclays. The products disclosed to support the invention are organophilic clays made using more common ammonium salts.

U.S. Pat. No. 4,677,158 discloses a thickener for aqueous suspensions, particularly latex paints and caulks that is prepared by reacting a smectite clay with an ethoxylated quaternary ammonium compound.

U.S. Pat. Nos. 4,517,094 and 4,549,966 describe large particle size organoclays that are purely hydrophobic in nature and are not water dispersible.

French Application No. 84401361.5 discloses modified organophilic clays prepared by combining a smectite, a quaternary ammonium salt with a long hydrocarbon chain, and a mono- or polyhydroxylated nitrogenous surfactant.

Most commercial detackification products currently employed in paint spray booths contain at least two components, generally a quaternary ammonium polymer and either a smectite clay or polyacrylamide. Each component must be introduced separately into the spray booth and in a closely monitored and controlled fashion to maintain the proper ratio of components. Detackification efficiency is adversely affected when the proper ratio is not maintained.

SUMMARY OF THE INVENTION

The present invention overcomes the problems and disadvantages of the prior art, and advances the state of the art, by providing methods of treating waste water for organic contaminants and more specifically, detackifying paint overspray collected in water circulating systems employed in spray booth operations. The methods of the invention achieve a greater degree of detackification of certain paint formulations while employing less detackifying agent than prior art methods.

It is an object of the invention to provide a method of successfully flocculating and detackifying clear coat, polyester melamine and acrylic enamel formulations as well as other paints of the type used in paint booths.

It is an additional object of the invention to provide a method of detackifying paint overspray that yields a paint floc that floats on the water surface and thus facilitates collection.

It is yet an additional object of the invention to provide a one component detackifying agent in a liquid form.

It is a further object of the invention to provide a method of detackifying paint overspray that yields a paint floc that is non-tacky and does not adhere to equipment.

It is yet a further object of the invention to provide a method of detackifying paint overspray that yields a paint floc that displays excellent filtration and dewatering properties.

It is yet an additional object of the invention to provide a method of detackifying paint overspray that yields a water phase that is suitable for recirculation.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, in one embodiment the invention provides a method of treating waste water for organic contaminants and also detackifying paint overspray containing paint particles and wash water comprising contacting the waste water or overspray with a water dispersible organoclay consisting essentially of a reaction product of at least one ammonium salt and at least one smectite clay. The water dispersible nature of the organoclay is achieved by balancing the hydrophobic/hydrophilic nature of the ammonium salt and clay composition via the choice of constituent groups on the ammonium salt(s). The water dispersible organoclay may optionally contain gangue and/or filler. The one component organically modified clay provides introduction of a constant composition into the spray booth and ensures the operator that an optimum composition for highly efficient detackification is employed.

In another embodiment, the present invention provides a method of treating waste water for organic contaminants and also detackifying paint overspray comprising contacting the waste water or overspray in one step with at least one ammonium salt and in a separate step with at least one smectite clay. The smectite clay may optionally contain gangue and/or filler.

It has been discovered that the methods of the invention achieve a greater degree of detackification of certain clear coat, polyester melamine and acrylic enamel formulations than prior art methods. Further, the methods of the invention require less agent to detackify a fixed quantity of paint than prior art methods.

By the methods of the invention, it is possible to produce a paint floc which floats on the water surface, is nontacky and does not adhere to equipment. Further, the methods of the invention provide paint floc that displays excellent filtration and dewatering properties and yields a water phase that is suitable for recirculation.

BRIEF DESCRIPTION OF THE DRAWING

FIG. 1 is an illustration of the laboratory spray booth employed in Example 2.

DESCRIPTION OF THE PREFERRED EMBODIMENTS

Reference will now be made in detail to the present preferred embodiments of the invention.

Smectite clays, either naturally occurring, synthetic or treated to reduce the cation exchange capacity are suitable for use in the methods of the present invention. Exemplary suitable smectite clays for use in the methods of the invention include crude hectorite clay, beneficiated hectorite clay, crude bentonite and beneficiated bentonite clay. The ability to use crude clay in the methods of the invention provide significant cost savings since it is not necessary to carry out a clay beneficiation process.

Exemplary suitable ammonium salts for use in the methods of the invention include those that contain at least one hydrocarbon chain containing from about eight to about thirty carbon atoms, i.e., "$C_8$ to $C_{30}$", preferably from 12 to 22 carbon atoms and most preferably from 12 to 18 carbon atoms and at least one hydrophilic carbon chain containing at least two carbon atoms such that the ammonium salt/clay composite yields a modified methylene blue test percent sites exchanged value of at least 25%. Exemplary suitable ammonium salts are represented by the formulae:

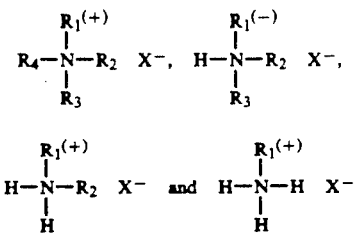

wherein in the above formulae at least one of $R_1$, $R_2$, $R_3$ and $R_4$ represent a hydrophilic chain containing at least two carbon atoms (i) in ethoxylated or propoxylated form or (ii) having at least one moiety selected from the group consisting of —COO, —$SO_4$, $PO_4$, $CH_3COO$, $CO_3$ and $SO_3$ in acid or salt form, or (iii) having at least three hydroxy groups and wherein a compound formed from this chain (i.e., H-$R_1$, H-$R_2$, H-$R_3$, or H-$R_4$) has a water solubility of at least about 1 g/liter, and at least one of $R_1$, $R_2$, $R_3$ and $R_4$ is a hydrophobic chain of from $C_8$ to $C_{30}$ carbon atoms and wherein a compound formed from this chain has a water solubility of less than about 1 g/liter, R—N is a nitrogen-carbon bond, $X^-$ is an anion, commonly $Cl^-$, $Br^-$, $I^-$, $OH^-$ and H is hydrogen. The hydrophilic and hydrophobic chains may be present in the same ammonium salt or different ammonium salts.

The method developed to measure the relative hydrophilic/hydrophobic character of organoclays for use in the present invention is a variation of the methylene blue spot test procedure set forth in Grimshaw, "The Chemistry and Physics of Clays," pp. 264–265, Interscience (1971). The normal methylene blue spot test procedure is well known in the art for the determination of clay cation exchange capacity (CEC). In the modified method used in the present invention, the relative hydrophilic/hydrophobic character of the ammonium salt and clay composite is related to the percentage of clay exchange sites on the organoclay which can be exchanged with methylene blue and/or the percentage of exchange sites where methylene blue can displace exchanged ammonium ions. This measurement can be used to predict ammonium salt and clay utility in the synthesis of effective water dispersible organoclay paint detackifying agents.

In the modified methylene blue test method, an ammonium salt is reacted with an aqueous slurry of smectite clay of known cation exchange capacity (as determined by the normal methylene blue test) to form the organoclay. The ammonium salt is employed at a loading that will satisfy or exceed the cation exchange capacity of the unreacted clay. The organoclay reaction is carried out at 65° C. for 30 minutes, after which the aqueous organoclay slurry is cooled to room temperature. The percent of organoclay solids is determined by accurately weighing a portion of the slurry and heating at 105° C. to constant weight.

To perform the analysis, approximately 10 grams of organoclay slurry (~5% solids) are accurately weighed into a 100 ml beaker. The slurry is acidified with 1 ml of 5N sulfuric acid and diluted with 10 mls isopropyl alcohol and 5 mls of water. The sample is then titrated, with magnetic stirring, versus standard 0.01N solution of methylene blue chloride. The titration is performed by adding methylene blue in 1 ml increments, waiting 30 seconds after the incremental addition, then placing a drop of sample on a #1 Whatman paper and checking for the appearance of the characteristic blue halo endpoint. When the halo point is reached an additional 2 minute waiting period is employed, after which another drop of sample is tested. If the blue halo is still present, the endpoint has been reached; if not, the titration is continued. The endpoint is reached when the blue halo is present after a minimum 2 minute mixing time.

The cation exchange capacity of the organoclay for methylene blue is calculated in the following manner:

$$CEC = \frac{\text{mls titrant} \times N \text{ of methylene blue} \times 100}{\text{grams of smectite clay solids}}$$

CEC is expressed as milliequivalents per 100 grams clay.

The value for the grams of smectite clay solids is obtained by multiplying (grams of organoclay slurry weighed) $\times$ (% solids of the organoclay slurry) $\times$ (% smectite clay in the organoclay product).

The cation exchange capacity obtained for the organoclay for methylene blue is then compared to the cation exchange capacity of the smectite clay itself, i.e., smectite clay not organically modified. The result is the percentage of clay sites on the organoclay which exchanged with methylene blue. This measurement is seen to be a relative expression of the hydrophilic/hydrophobic character of the ammonium salt/clay composite used to prepare the water dispersible organoclay.

More preferably, the ammonium salt/clay composite employed in the methods of the invention have a modified methylene blue test value, as defined herein, of at least 40% sites exchanged value, most preferably at least 60% sites exchanged value.

A preferred ammonium salt for use in the invention is octadecyl-methyl-[ethoxylated (15)]ammonium chloride (tradename Ethoquad 18/25 a commercial product of Akzo Chemicals, Inc.), which has the following chemical structure:

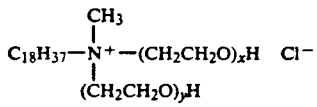

wherein $x+y=15$, and the molecular weight is approximately 994.

Another preferred ammonium salt for use in the invention is coco-methyl-[ethoxylated (15)]ammonium chloride (tradename Ethoquad C/25 a commercial product of Akzo Chemicals, Inc.), which has the following structure:

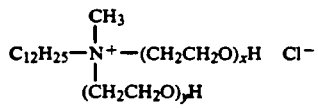

wherein $x+y=15$, and the molecular weight is approximately 925. Additional preferred ammonium salts for use in the invention include hydrogenated tallow-methyl-[ethoxylated(15)] ammonium chloride and soft tallow-methyl-[ethoxylated(15)] ammonium chloride.

Preferred water dispersible organoclays consisting of a reaction product of at least one ethoxylated quaternary ammonium salt and at least one smectite clay for use in the invention include organoclays consisting of the reaction products of (1) 70 me Ethoquad 18/25 and crude hectorite; (2) 135 me Ethoquad 18/25 and beneficiated hectorite; and (3) 135 me Ethoquad 18/25 and beneficiated bentonite (wherein the above me are based upon 100 g of reaction solids, i.e., clay plus gangue plus soluble salt).

The milliequivalents of the preferred ammonium salts employed to prepare the water dispersible organoclay are 60–180%, preferably 90–150% of the clay cation exchange capacity.

The organoclays of the present invention may be prepared according to conventional techniques disclosed among the patents referred to in the Background of the Invention, the contents of which are incorporated by reference. However, the organoclays do not have to be separated from the reaction and dried to be used to treat waste water or paint overspray.

The methods of the invention achieve the most efficient paint detackification when the water in the spray booth is adjusted to a pH of from about 8 to about 10. The alkaline pH minimizes equipment corrosion, and the $CaCO_3$ gangue, which is a component of organoclays based on crude hectorite, assists in maintaining an alkaline pH.

As used herein, the term "gangue" means the nonclay portion of a mined clay, such as bentonite or hectorite. Preferably, the gangue or filler is employed in an amount of from about 5% to about 75% filler or gangue based on the weight of the clay.

The gangue may provide additional beneficial properties to organoclay paint detackification. For example, when conventional organoclays which contain no gangue component are employed as detackifying agents in a spray booth, the initial paint floc generated may be sticky in consistency. This initial sticky phase, which is highly undesirable, does not disappear until later in the paint spray addition. In contrast, organoclays based on crude hectorite clay i.e., organoclay plus gangue component, do not exhibit the initial sticky phase. It is believed that the presence of gangue particles increases the effective surface area of the detackifying agent and thus increases the contact area between the detackifying agent and paint particles.

Exemplary suitable gangue or fillers for use in the invention include calcium carbonate, dolomite, calcite, silica, silica dioxide, quartz, and metal oxides such as calcium oxide and zinc oxide.

Wetting agents, suspending agents, surfactants or dispersants may be employed in the methods of the invention to yield compositions which remain more uniformly distributed in the water circulating system or to assist gangue participation in detackification. Other conventional additives, such as preservatives and defoaming agents, may also be employed.

The invention will be further clarified by the following examples which are intended to be purely exemplary of the invention.

EXAMPLE 1

The hydrophilic/hydrophobic character of several ammonium salt/clay composites was measured using the previously described method. The smectite clay used was beneficiated hectorite which possessed a CEC of 108 m.e./100 grams clay as determined by the normal methylene blue test. All organoclays were prepared by reacting 108 m.e. or more of each ammonium salt with the smectite clay. Organoclay cation exchange capacity and paint detackification efficiency data are presented in Table I.

TABLE I

| Ammonium Salt | C.E.C. m.e. | % Sites Exchanged w/Methylene Blue | Paint Detackification Efficiency 70 m.e.Quat/Crude Hectorite | |
|---|---|---|---|---|
| | | | mls Paint per 6.75 g Crude Clay | mls Paint per g Organoclay |
| 2M2HT | 14.9 | 13.8 | 10.5 | 1.1 |
| Octadecyl-methyl-[ethoxylated (2)] | 26.3 | 24.4 | 7.0 | 0.8 |
| 3MHT | 31.6 | 29.3 | 19.0 | 2.3 |
| Tetrabutyl | 33.0 | 30.6 | 6.5 | 0.8 |
| 15/85 MHT[Eth. (50)]/3MHT | 41.4 | 38.3 | 19.0 | 1.9 |
| Coco Trimethyl | 42.2 | 39.1 | 11.0 | 1.4 |
| 30/70 MHT[Eth. (50)]/3MHT | 43.3 | 40.1 | 31.5 | 2.8 |
| 45/55 MHT[Eth. (50)]/3MHT | 63.5 | 58.8 | 32.0 | 2.5 |
| Quaternary Ammonium Polymer* | 75.5 | 69.9 | 25.0 | 3.2 |
| Coco-methyl-[ethoxylated (15)] | 76.8 | 71.1 | 27.0 | 2.4 |
| Coco amido 2 hydroxypropyl sultaine | 82.0 | 75.9 | 18.5 | 2.1 |
| Octadecyl-methyl-[ethoxylated (15)] | 91.9 | 85.1 | 46.0 | 4.0 |
| HT-methyl-[ethoxylated (50)] | 96.4 | 89.3 | 34.5 | 1.8 |
| Methyl-diethyl-[polyoxypropylene (25)] | 110.1 | 101.9 | 1.5 | 0.1 |
| Hectorite clay - no organic modification | 108 | 100 | — | — |

Where M = $CH_3$, HT = hydrogenated tallow, ETH = ethoxylated
*In performing the modified methylene blue spot test, organoclay was diluted with 15 mls water as opposed to 10 mls isopropyl alcohol and 5 mls water. Blue halo endpoint could not be read when this organoclay composition was diluted with isopropyl alcohol/water.

The data indicate that ammonium salts such as Octadecyl-methyl-[ethoxylated(15)]ammonium chloride and Cocomethyl-[ethoxylated(15)]ammonium chloride which produce organoclays that yield high detackification efficiency, also produce organoclays in which a high percentage of the clay exchange sites are exchanged with methylene blue. Ammonium salts such as 2M2HT and Octadecyl-methyl-[ethoxylated(2)]ammonium chloride which have little or no hydrophilic character yield organoclays which display poor detackification efficiency and a low percentage of sites exchangeable with methylene blue. The data demonstrate that mixing a highly hydrophobic ammonium salt (3MHT) with a highly hydrophilic ammonium salt (hydrogenated tallow-methyl-[ethoxylated(50)]ammonium chloride) can be used to modify the product hydrophilic/hydrophobic balance to achieve more efficient paint detackification. An organoclay prepared with methyl-diethyl-[polyoxypropylene(25)] ammonium chloride yields a composition in which a high percentage of clay exchange sites are exchanged with methylene blue but the organoclay does not function as a paint detackifier. This composition most probably fails as a detackifier because it lacks the hydrophobic long chain hydrocarbon necessary to provide affinity for the paint. However, if used in combination with a highly hydrophobic ammonium salt, the methyl-diethyl-[polyoxypropylene(25)] ammonium chloride may ultimately be used to synthesize a successful organoclay detackifying agent.

EXAMPLE 2

Example 2 sets forth the general procedure of synthesis of organoclay paint detackifier samples. The effect on detackification efficiency of reacting the crude hectorite clay (55% hectorite clay, 45% gangue) component with various amines and ammonium salts was evaluated.

381.0 g of a 5.25% solids sheared using a Tekmar SD-45 disperser crude hectorite clay slurry (20 g crude clay solids) were placed in a 3 liter reaction vessel, diluted with 280 ml of water and heated to 65° C. with stirring. A charge of either 55 me or 70 me per 100 grams of total solids of various amines and ammonium salts was added to the clay slurry. As set forth in Table II, the amines and ammonium salts evaluated include tertiary amines, ethoxylated amines, amine oxides, low molecular weight quaternary amines, zwitterion quaternary amines, polypropoxy quaternary amines, ethoxylated quaternary amines and standard quaternary amines such as 2M2HT, BM2HT and B2MHT. The mixtures were stirred at 65° C. for 30 minutes, cooled (no filtration step), Tekmar sheared for approximately 10 seconds to break up agglomerates and analyzed for % solids.

All samples were evaluated for paint detackification efficiency versus the Dupont TM RK-3840 Rigid Clearcoat. Testing was carried out in a laboratory paint spray booth illustrated in FIG. 1. The spray booth tank was charged with approximately 18 liters of water which was circulated at a rate of 2.5 gallons per minute through the scrubbing section back to the tank. The organoclay paint detackifier samples were employed in the spray booth at loadings comprising 2.25 g of crude clay solids. The detackifiers were allowed to mix in the system through water circulation for approximately 5 minutes. The water was adjusted to pH 8 with sodium hydroxide. Next, the paint was sprayed into the booth at a rate of approximately 1.5 ml per minute through an air atomized spray nozzle located 12 inches above the center of the scrubbing section. The paint/organoclay floc which was generated was collected from the tank by hand and evaluated for stickiness. Tackiness or stickiness was subjectively determined by the test runner wetting his hand in the test tank water solution, collecting a sample of the floating paint sludge from the water tank and then squeezing and rubbing the sludge between his fingers. Paint spraying was continued until a noticeable degree of stickiness was apparent, at which point the volume of paint sprayed was recorded. A maintenance dose of detackifier, equal to the loading employed in the initial dose, was then added to the water, the paint spray restarted and the volume of additional paint successfully detackified recorded.

Data presented in Table II demonstrate that organoclays composed of certain ethoxylated ammonium salts provide a level of paint detackification efficiency that is two to four times greater than that provided by any of the other organoclay samples tested. The large body of work presented in Table I demonstrates that certain ethoxylated ammonium salts possess the unique property of yielding single component organoclay compositions which provide highly efficient paint detackification.

EXAMPLE 3

This example details the preparation of a preferred composition based on crude hectorite clay (55% clay, 45% gangue).

381.0 g of a 5.25% solids Tekmar sheared crude hectorite clay slurry were placed in a 3 liter reaction vessel, diluted to 3% solids with 280 ml of water and heated to 65° C. with stirring. 14.35 g of 97% active octadecyl-methyl-[ethoxylated (15)]ammonium chloride (70 me per 100 grams of total solids) were heated and poured into the clay slurry. The mixture was stirred for 30 minutes at 65° C., cooled (no filtration step), Tekmar sheared for approximately 10 seconds to break up agglomerates and analyzed for % solids. % solids=4.62%.

EXAMPLE 4

The laboratory paint spray booth tank was charged with approximately 18 liters of water which were circulated at a rate of 2.5 gallons per minute. 82 68 g of the organoclay detackifier sample slurry of Example 3 (comprising 3.82 g organoclay solids, 2.25 g crude clay solids) were added to the spray booth and allowed to mix in the system through water circulation for approximately 5 minutes. The water was adjusted to pH 8 with sodium hydroxide. The Dupont RK-3840 Rigid Clearcoat paint was sprayed into the booth at a rate of approximately 1.5 ml per minute through an air atomized spray nozzle located 12 inches above the center of the scrubbing section. The paint/organoclay floc which was generated was collected from the tank by hand and evaluated for stickiness. Paint spraying was continued until a noticeable degree of stickiness was apparent, at which point the volume of paint sprayed was recorded. A maintenance dose of detackifier, equal to the loading employed in the initial dose, was then added to the water, the paint spray restarted and the volume of additional paint successfully detackified recorded.

The volume of paint detackified with the initial dose of organoclay detackifier was 14.0 mls and the volume of paint detackified in subsequent maintenance doses was 14.5 mls and 17.5 mls respectively. This example demonstrates that the preferred organoclay composition can be prepared using crude clay.

EXAMPLE 5

This example details the preparation of a preferred composition based on beneficiated hectorite clay.

321.54 g of a 3.11% solids Tekmar sheared beneficiated hectorite clay slurry were placed in a 3 liter reaction vessel, diluted to 2% solids with 179 mls of water and heated to 65° C. with stirring. 13.82 g of 97% active octadecyl-methyl[ethoxylated (15)]ammonium chloride (135 me per 100 g of total solids) were heated and poured into the clay slurry. The mixture was stirred for 30 minutes at 65° C., cooled (no filtration step), Tekmar sheared for approximately 10 seconds to break up agglomerates and analyzed for % solids. % solids=3.89%.

EXAMPLE 6

The organoclay detackifier sample slurry of Example 4 was replaced with 75.06 g of the organoclay detackifier sample slurry of Example 5 (2.92 g organoclay solids, 1.25 g of clay solids).

The volume of paint detackified with the initial dose of organoclay detackifier was 10.5 mls and the volume of paint detackified in subsequent maintenance doses was 13.0 mls and 15.0 mls respectively. This example demonstrates that the preferred organoclay composition can be prepared using beneficiated hectorite clay.

EXAMPLE 7

This example details the preparation of a preferred composition based on bentonite clay.

519.03 g of a 2.89% solids Tekmar sheared bentonite clay slurry were placed in a 3 liter reaction vessel, diluted to 2% solids with 230 mls of water and heated to 65° C. with stirring. 20.75 g of 97% active octadecyl-methyl-[ethoxylated (15)] ammonium chloride (135 me per 100 g solids) were heated and poured into the clay slurry. The mixture was stirred for 30 minutes at 65° C., cooled (no filtration step), Tekmar sheared for approximately 10 seconds to break up agglomerates and analyzed for % solids. % solids=4.36%.

EXAMPLE 8

The organoclay detackifier sample slurry of Example 4 was replaced with 66.97 g of the organoclay detackifier sample slurry of Example 7 (2.92 g organoclay solids, 1.25 g clay solids).

The volume of paint detackified with the initial dose of organoclay detackifier was 14.0 mls and the volume of paint detackified in subsequent maintenance doses was 13.5 mls and 13.0 mls respectively. This example demonstrates that the preferred organoclay composition can be prepared using bentonite clay.

EXAMPLE 9

The organoclay detackifier sample slurry of Example 4 was replaced with a mixture of 42.53 g of a 5.29% solids Tekmar sheared crude hectorite clay slurry (2.25 g crude hectorite solids) and 1.61 g of 97% active octadecyl-methyl-[ethoxylated (15)]ammonium chloride (70 me per 10 g total solids). Each component was added separately to the spray booth.

The volume of paint detackified with the initial dose of the two component detackifier was 7.0 mls and the volume of paint detackified in subsequent maintenance doses was 13.0 mls and 12.0 mls respectively. This example demonstrates that effective paint detackification can be achieved when the ammonium salt and crude hectorite clay components are employed by separate addition to the spray booth.

EXAMPLE 10

The organoclay detackifier sample slurry of Example 4 was replaced with a mixture of 38.23 g of a 3.27% solids Tekmar sheared beneficiated hectorite clay slurry (1.25 g clay solids) and 1.73 g of 97% active octadecyl-methyl-[ethoxylated (15)] ammonium chloride (135 me per 100 g total solids). Each component was added separately to the spray booth.

The volume of paint detackified with the initial dose of the two component detackifier was 15.0 mls and the volume of paint detackified in subsequent maintenance doses was 12.5 mls and 14.5 mls respectively. This example demonstrates that effective paint detackification can be achieved when the ammonium salt and beneficiated hectorite clay components are employed by separate addition to the spray booth.

EXAMPLE 11

This example details the preparation of a preferred composition produced in the dry form.

290.14 g of a 5.17% solids Tekmar sheared crude hectorite clay slurry were placed in a 3 liter reaction vessel and heated to 65° C. with stirring. 10.76 g of 97% active octadecyl-methyl-[ethoxylated (15)]ammonium chloride (70 me per 100 g total solids) were heated and poured into the clay slurry. The mixture was stirred for 30 minutes at 65° C., cooled (no filtration step), Tekmar sheared for approximately 10 seconds, transferred to a glass evaporating dish, dried for 16 hours at 60° C. in a forced air oven, cooled with liquid nitrogen and ground in a centrifugal mill fitted with a 0.5 mm screen. The dried, ground organoclay was slurried in water. % solids = 26.65%.

EXAMPLE 12

The organoclay detackifier sample slurry of Example 4 was replaced with 14.30 g of the organoclay detackifier sample slurry of Example 11 (3.81 g organoclay solids, 2.25 g crude clay solids). The volume of paint detackified with the initial dose of organoclay detackifier was 2.0 mls and the volume of paint detackified in subsequent maintenance doses was 10.0 mls and 10.0 mls respectively. This example demonstrates that a preferred organoclay composition can be subjected to drying and still display significant paint detackification efficiency, although the level of paint detackification efficiency is diminished.

COMPARATIVE EXAMPLE A

The organoclay detackifier sample slurry of Example 4 was replaced with 4.63 g of a 42.63% solids aqueous slurry of Bentone 38 R/A (a commercial product of Rheox, Inc.) (1.98 g organoclay solids, 1.25 g clay solids).

The volume of paint detackified with the initial dose of Bentone 38 R/A was 1.0 ml and the volume of paint detackified in subsequent maintenance doses was 1.0 ml, 1.5 mls, 2.0 mls and 2.0 mls, respectively. This comparative example demonstrates the relatively poor detackification efficiency obtained for an organophilic organoclay compared to the excellent detackification efficiency obtained by the water dispersible organoclays of this invention.

COMPARATIVE EXAMPLE B

The organoclay detackifier sample slurry of Example 4 was replaced with 7.15 g of a 27.69% solids aqueous slurry of Bentone 34 R/A (a commercial product of Rheox, Inc.) (1.98 g organoclay solids, 1.25 g clay solids).

The volume of paint detackified with the initial dose of Bentone 34 R/A was 1.0 ml and the volume of paint detackified in subsequent maintenance doses was 1.5 mls, 1.0 ml, 1.5 mls and 1.5 mls respectively. This comparative example also demonstrates the relatively poor detackification efficiency obtained for an organophilic organoclay compared to the excellent detackification efficiency obtained by the water dispersible organoclays of this invention.

EXAMPLE 13

This example details the preparation of a preferred composition based on crude hectorite clay. The organoclay was prepared in bulk for evaluation versus various paint formulations.

1134.2 g of a 5.29% solids Tekmar sheared crude hectorite clay slurry were placed in a 3 liter reaction vessel, diluted to 3.3% solids with 680 ml of water and heated to 65° C. with stirring. 43.05 g of 97% active octadecyl-methyl[ethoxylated (15)]ammonium chloride (70 me per 100 g of total solids) were heated and poured into the clay slurry. The mixture was stirred for 30 minutes at 65° C., cooled (no filtration step), Tekmar sheared for 10 seconds to break up agglomerates and analyzed for % solids. % solids = 4.52%.

EXAMPLE 14

The organoclay detackifier sample slurry of Example 4 was replaced with 84.3 g of the organoclay detackifier sample slurry of Example 13 (3.81 g organoclay solids, 2.25 g crude clay solids).

The Dupont RK-3840 Rigid Clearcoat paint employed in Example 4 was replaced with PPG DCT-3000 Clearcoat paint.

The volume of PPG DCT-3000 Clearcoat detackified with the initial dose of organoclay detackifier was 16.5 mls and the volume of paint detackified in subsequent maintenance doses was 13.5 mls and 20.0 mls respectively.

EXAMPLE 15

The organoclay detackifier sample slurry of Example 4 was replaced with 84.3 g of the organoclay detackifier sample slurry of Example 13 (3.81 g organoclay solids, 2.25 g crude clay solids).

The Dupont RK-3840 Rigid Clearcoat paint employed in Example 4 was replaced with High Solids Polyester Melamine Baking Enamel Aroplaz 6755-A6-80.

The volume of Polyester Melamine paint detackified with the initial dose of organoclay detackifier was 12.5 mls and the volume of paint detackified in subsequent maintenance doses was 10.0 mls and 11.0 mls respectively.

EXAMPLE 16

The organoclay detackifier sample slurry of Example 4 was replaced with 84.3 g of the organoclay detackifier sample slurry of Example 13 (3.81 g organoclay solids, 2.25 g crude clay solids).

The Dupont RK-3840 Rigid Clearcoat paint employed in Example 4 was replaced with the Dupont White High Solids Acrylic Enamel.

The volume of acrylic enamel paint detackified with the initial dose of organoclay detackifier was 10.5 mls and the volume of paint detackified in subsequent maintenance doses was 9.5 mls and 9.5 mls respectively.

Examples 14, 15 and 16 demonstrate that the water dispersible organoclays of this invention are effective detackifiers for a variety of different paint formulations.

EXAMPLE 17

The paint/organoclay floc generated in Example 4 was collected and placed in a glass beaker. On standing for several minutes, the foamy floc broke down and yielded a liquid/solids mix. Approximately 175 mls of the floc were passed through a 4 inch diameter glass funnel fitted with Whatman 541 filter paper. The material was allowed to gravity filter overnight, even though it was observed that a majority of the liquid had passed through the filter paper in the first 20-30 minutes. The filtrate obtained was clear and exhibited no odor. The material retained in the filter was collected and analyzed for % solids by heating at 105° C. to constant weight. % solids obtained was 40.1%. This example demonstrates the excellent filtration and dewatering properties obtained for detackified paint floc generated using the water dispersible organoclay of this invention.

wherein said at least one ammonium salt is selected from ammonium salts represented by the formulae:

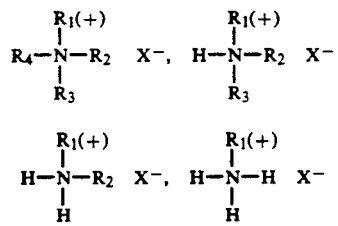

TABLE II

Paint detackification efficiency vs. DuPont RK 3840 clearcoat. Organoclays composed of various amines and ammonium salts on crude hectorite. All compositions employed at a loading comprising 2.25 g crude hectorite solids.

| Amine | Amine M.E. | mls of Paint Detackified | | | total mls detackified per 6.75 g crude clay |
|---|---|---|---|---|---|
| | | Initial | 1st Maint. | 2nd Maint. | |
| Cocotrimethyl Ammonium Chloride | 55 | 3.0 | 3.0 | 4.0 | 10.0 |
| Cocotrimethyl Ammonium Chloride | 70 | 2.5 | 5.0 | 3.5 | 11.0 |
| Tetramethyl Ammonium Chloride | 55 | 1.5 | 1.5 | 1.0 | 4.0 |
| Tetrabutyl Ammonium Bromide | 55 | 1.0 | 2.0 | 2.5 | 5.5 |
| Tetrabutyl Ammonium Bromide | 70 | 1.5 | 2.0 | 3.0 | 6.5 |
| Dicoco Dimethyl Ammonium Chloride | 55 | 3.0 | 3.0 | 4.0 | 10.0 |
| Octyl Decyl Dimethyl Ammonium Chloride | 55 | 1.5 | 1.5 | 2.5 | 5.5 |
| B2MHT Ammonium Chloride | 55 | 1.0 | 7.5 | 4.5 | 13.0 |
| B2MHT Ammonium Chloride | 70 | 1.5 | 4.0 | 4.5 | 10.0 |
| 2M2HT Ammonium Chloride | 55 | 1.5 | 3.5 | 4.0 | 9.0 |
| 2M2HT Ammonium Chloride | 70 | 1.5 | 4.5 | 4.5 | 10.5 |
| BM2HT Ammonium Chloride | 55 | 1.0 | 1.0 | 1.0 | 3.0 |
| Coco-Methyl-[Ethoxylated (2)] Ammonium Chloride | 55 | 1.0 | 4.5 | 4.0 | 9.5 |
| Coco-Methyl-[Ethoxylated (15)] Ammonium Chloride | 55 | 1.0 | 8.5 | 11.5 | 21.0 |
| Coco-Methyl-[Ethoxylated (15)] Ammonium Chloride | 70 | 4.5 | 11.5 | 11.0 | 27.0 |
| Octadecyl-Methyl-[Ethoxylated (2)] Ammonium Chloride | 70 | 1.0 | 3.0 | 3.0 | 7.0 |
| Octadecyl-Methyl-[Ethoxylated (15)] Ammonium Chloride | 70 | 14.0 | 14.5 | 17.5 | 46.0 |
| Cocoamido 2-Hydroxypropyl Sultaine | 70 | 1.0 | 9.0 | 8.5 | 18.5 |
| Cocoamido Propyl Betaine | 70 | 2.0 | 4.0 | 4.0 | 10.0 |
| Cocoamido Propyl Hydroxy Sultaine | 70 | 1.0 | 1.5 | 4.0 | 6.5 |
| Tallow Amido Propyl Hydroxy Sultaine | 70 | 3.0 | 2.0 | 2.0 | 7.0 |
| Coco Amphopropyl Sulphonate | 70 | 0.5 | 1.0 | 0.5 | 2.0 |
| Dimethyldodecyl (2-Sulfatoethyl) Ammonium Zwitterion | 70 | 1.0 | 2.5 | 1.0 | 4.5 |
| Octadecyl Dimethyl (2-Sulfatoethyl) Ammonium Zwitterion | 70 | 0.5 | 1.0 | 0.5 | 2.0 |
| Dimethyl (2-carboethyoxymethyl) Octadecyl Ammonium Zwitterion | 70 | 0.5 | 0.5 | 2.5 | 3.5 |
| Polyoxypropylene (9) Methyl Diethyl Ammonium Chloride | 70 | 0.5 | 1.0 | 1.0 | 2.5 |
| Polyoxypropylene (25) Methyl Diethyl Ammonium Chloride | 70 | 0.5 | 0.5 | 0.5 | 1.5 |
| Polyoxypropylene (40) Methyl Diethyl Ammonium Chloride | 70 | 1.0 | 1.0 | 1.0 | 3.0 |
| Octadecyl-Dimethylamine | 70 | 1.0 | 1.0 | 1.0 | 3.0 |
| Ethoxylated (10) Octadecylamine | 70 | 1.0 | 1.0 | 1.0 | 3.0 |
| Ethoxylated (50) Octadecylamine | 70 | 1.0 | 1.0 | 1.0 | 3.0 |
| Dimethyl Hydrogenated Tallow Alkylamine Oxide | 70 | 0.5 | 1.0 | 1.0 | 2.5 |
| Bis (2-Hydroxyethyl)-Tallow Alkyl Amine Oxide | 70 | 1.0 | 1.0 | 2.0 | 4.0 |
| HT-Methyl-[Ethoxylated (50)]Ammonium Chloride | 70 | 8.0 | 11.5 | 15.0 | 34.5 |
| HT-Methyl-[Ethoxylated (15)]Ammonium Chloride | 70 | 14.0 | 15.0 | — | 29.0* |
| Tallow-Methyl-[Ethoxylated (15)]Ammonium Chloride | 70 | 12.5 | 14.0 | — | 26.5* |
| 3MHT Ammonium Chloride | 70 | 3.0 | 6.0 | 10.0 | 19.0 |

*per 4.50 g crude clay
M = methyl
B = benzyl
HT = hydrogenated tallow

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method of treating waste water containing organic contaminants comprising contacting said waste water with a water dispersible organoclay consisting essentially of a reaction product formed by reacting at least one ammonium salt with at least one smectite clay wherein at least one of $R_1$, $R_2$, $R_3$ and $R_4$ represent a hydrophilic chain containing at least two carbon atoms (i) in ethoxylated or propoxylated form or (ii) having at least one moiety selected from the group consisting of —COO, —SO$_4$, PO$_4$, CH$_3$COO, CO$_3$ and SO$_3$ in acid or salt form, or (iii) having at least three hydroxy groups and wherein a compound formed from this chain has a water solubility of at least about 1 g/liter, and at least one of $R_1$, $R_2$, $R_3$ and $R_4$ is a hydrophobic chain of from $C_8$ to $C_{30}$ carbon atoms and wherein a compound formed from this chain has a water solubility of less than about 1 g/liter, R—N is a nitrogen-carbon bond, $X^-$ is an anion and wherein said at least one ammonium salt in combination with said at least one smectite clay has a modified methylene blue test value of at least 25 percent sites exchanged.

2. The method of claim 1 wherein the at least one hydrophobic chain and the at least one hydrophilic chain are contained on one ammonium salt.

3. The method of claim 2 wherein said at least one ammonium salt is at least one ethyoxylated ammonium salt selected from the group consisting of octadecyl-methyl-ammonium chloride, coco-methyl-ammonium chloride, hydrogenated tallow-methyl-ammonium chloride and soft tallow-methyl-ammonium chloride.

4. The method of claim 3 wherein said at least one ethoxylated quaternary ammonium salt in combination with said at least one smectite clay has a modified methylene blue test value of at least 40 percent sites exchanged.

5. The method of claim 3 wherein said at least one ethoxylated quaternary ammonium salt in combination with aid at least one smectite clay has a modified methylene blue test value of at least 60 percent sites exchanged.

6. The method of claim 3 wherein the milliequivalent amount of said at least one ammonium salt is 60-180% of the clay cation exchange capacity in milliequivalents.

7. The method of claim 1 wherein said at least one smectite clay is at least one clay selected from the group consisting of crude hectorite clay, beneficiated hectorite clay, crude bentonite clay and beneficiated bentonite clay.

8. A method of detackifying paint overspray containing paint particles and wash water comprising contacting said overspray with a water dispersible organoclay consisting essentially of a reaction product formed by reacting at least one ammonium salt with at last one smectite clay wherein said at last one ammonium slat is selected from ammonium salts represented by the formulae:

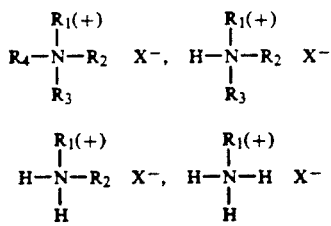

wherein at last one of $R_1$, $R_2 R_3$ and $R_4$ represent a hydrophilic chain containing at least two carbon atoms (i) in ethoxylated or propoxylated form or (ii) having at least one moiety selected from the group consisting of —COO, —SO$_4$, PO$_4$, CH$_3$COO, CO$_3$ and SO$_3$ in acid or salt form, or (iii) having at least three hydroxy groups and wherein a compound formed from this chain has a water solubility of at least about 1 g/liter, and at least one of $R_1$, $R_2$, $R_3$ and $R_4$ is a hydrophobic chain of from $C_8$ to $C_{30}$ carbon atoms and wherein a compound formed from this chain has a water solubility of less than about 1 g/liter, R—N is a nitrogen-carbon bond, $X^-$ is an anion and wherein said at least one ammonium salt in combination with said at least one smectite clay has a modified methylene blue test value of at least 25 percent sites exchanged.

9. A method of treating waste water containing organic contaminants comprising contacting said waste water separately with at least one ammonium salt and at least one smectite clay by forming in situ a water dispersible organoclay wherein said at least one ammonium salt is selected from ammonium salts represented by the formulae:

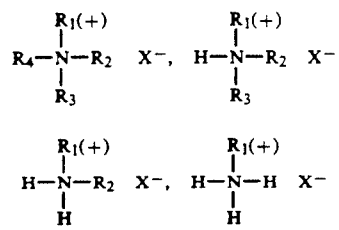

wherein at least one of $R_1$, $R_2$, $R_3$ and $R_4$ represent a hydrophilic chain containing at least two carbon atoms (i) in ethoxylated or propoxylated form or (ii) having at least one moiety selected from the group consisting of —COO, —SO$_4$, PO$_4$, CH$_3$COO, CO$_3$ and SO$_3$ in acid or salt form, or (iii) having at least three hydroxy groups and wherein a compound formed from this chain has a water solubility of at least about 1 g/liter, and at least one of $R_1$, $R_2$, $R_3$ and $R_4$ is a hydrophobic chain of from $C_8$ to $C_{30}$ carbon atoms and wherein a compound formed from this chain has a water solubility of less than about 1 g/liter, R—N is a nitrogen-carbon bond, $X^-$ is an anion and wherein said at least one ammonium salt in combination with said at least one smectite clay has a modified methylene blue test value of at least 25 percent sites exchanged.

10. The method of claim 9 wherein the at least one hydrophobic chain and the at least one hydrophilic chain are contained on one ammonium salt.

11. The method of claim 10 wherein said at least one ammonium salt is at least one ethoxylated ammonium salt selected from the group consisting of octadecyl-methyl-ammonium chloride, coco-methyl-ammonium chloride, hydrogenated tallow-methyl-ammonium chloride and soft tallow-methyl-ammonium chloride.

12. The method of claim 9 wherein said at least one ammonium salt in combination with said at least one smectite clay has a modified methylene blue test value of at least 40 percent sites exchanged.

13. The method of claim 9 wherein said at least one ammonium salt in combination with said at least one smectite clay has a modified methylene blue test value of at least 60 percent sites exchanged.

14. The method of claim 9 wherein the milliequivalent amount of said at least one ammonium salt is 60-180% of the clay cation exchange capacity in milliequivalents.

15. A method of detackifying paint overspray containing paint particles and wash water comprising contacting the overspray separately with at least one ammonium salt and at least one smectite clay to detackify a paint formulation by in situ formation of a water dispersible organoclay wherein said at least one ammonium salt is selected from ammonium salts represented by the formulae:

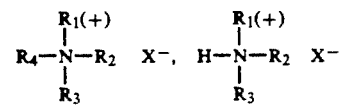

-continued

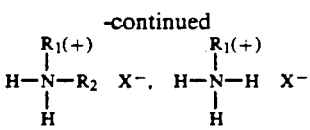

wherein at least one of $R_1$, $R_2$, $R_3$ and $R_4$ represent a hydrophilic chain containing at least two carbon atoms (i) in ethoxylated or propoxylated form or (ii) having at least one moiety selected from the group consisting of —COO, —SO$_4$, PO$_4$, CH$_3$COO, CO$_3$ and SO$_3$ in acid or salt form, or (iii) having at least three hydroxy groups and wherein a compound formed from this chain has a water solubility of at least about 1 g/liter, and at least one of $R_1$, $R_2$, $R_3$ and $R_4$ is a hydrophobic chain of from $C_8$ to $C_{30}$ carbon atoms and wherein a compound formed from this chain has a water solubility of less than about 1 g/liter, R—N is a nitrogen-carbon bond, $X^-$ is an anion and wherein said at least one ammonium salt in combination with said at least one smectite clay has a modified methylene blue test value of at least 25 percent sites exchanged.

* * * * *

UNITED STATES PATENT AND TRADEMARK OFFICE
CERTIFICATE OF CORRECTION

PATENT NO. :     5,130,028

DATED      :     July 14, 1992

INVENTOR(S) :    Cody et al.

It is certified that error appears in the above-identified patent and that said Letters Patent is hereby corrected as shown below:

In column 15, line 19, amend "aid" to --said--.

Signed and Sealed this

Fourteenth Day of September, 1993

Attest:

BRUCE LEHMAN

*Attesting Officer*     Commissioner of Patents and Trademarks